United States Patent [19]
Kaiser et al.

[11] 3,862,931
[45] Jan. 28, 1975

[54] GITOXIGENIN-DIGITOXOSIDE COMPOUNDS AND THERAPEUTIC COMPOSITIONS FOR COMBATING CARDIAC INSUFFICIENCY

[75] Inventors: Fritz Kaiser, Lampertheim; Hans Joachim Lubs, Weinheim; Wolfgang Schaumann, Heidelberg; Wolfgang Voigtlander, Viernheim, all of Germany

[73] Assignee: Boehringer Mannheim GmbH, Mannheim-Waldhof, Germany

[22] Filed: Mar. 11, 1974

[21] Appl. No.: 450,256

[30] Foreign Application Priority Data
Apr. 19, 1973 Germany............................ 2319873

[52] U.S. Cl.............................. 260/210.5, 424/182
[51] Int. Cl............................................ C07c 173/00
[58] Field of Search.................................. 260/210.5

[56] References Cited
UNITED STATES PATENTS
3,514,441  5/1970  Satoh et al....................... 260/210.5
3,531,462  10/1970  Satoh et al....................... 260/210.5

Primary Examiner—Lewis Gotts
Assistant Examiner—Cary B. Owens
Attorney, Agent, or Firm—Burgess, Dinklage & Sprung

[57] ABSTRACT
New gitoxigenin-digitoxoside compound of the formula

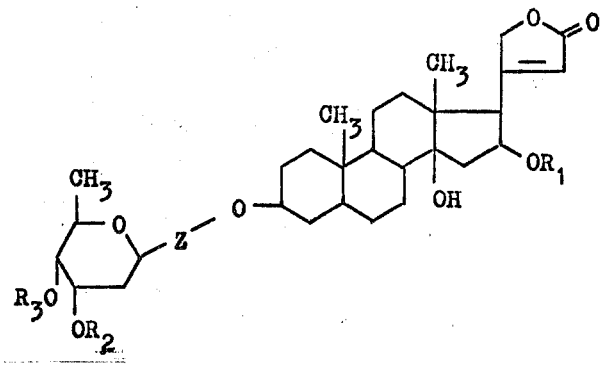

wherein
  $R_1$ is alkyl of up to 3 carbon atoms, which can be substituted by alkoxy of up to 3 carbon atoms;
  $R_2$ and $R_3$, which can be the same or different, are hydrogen or alkyl of up to 3 carbon atoms, which can be substituted by alkoxy radicals of up to 3 carbon atoms; or
  $R_2$ and $R_3$ can together also represent an acetal or ketal grouping containing 2 to 10 carbon atoms; and
  Z is a valency bond or two digitoxose residues, are outstandingly effective in the oral therapy of cardiac insufficiency.

19 Claims, No Drawings

GITOXIGENIN-DIGITOXOSIDE COMPOUNDS AND THERAPEUTIC COMPOSITIONS FOR COMBATING CARDIAC INSUFFICIENCY

The present invention is concerned with new derivatives of gitoxigenin-digitoxoside compounds, with therapeutic compositions containing them, and with methods for the oral therapy of cardiac insufficiency.

The new gitoxigenin-digitoxoside compounds according to the present invention are of the formula:

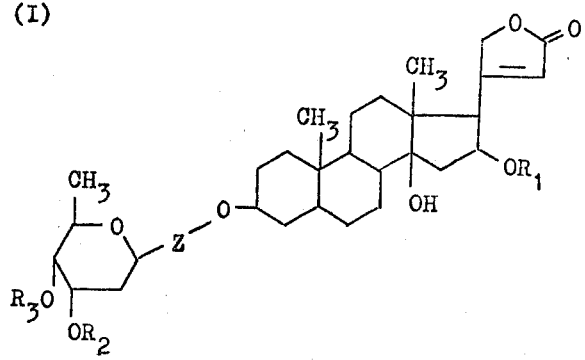

(I)

wherein
- $R_1$ is alkyl of up to 3 carbon atoms, which can be substituted by alkoxy of up to 3 carbon atoms;
- $R_2$ and $R_3$, which can be the same or different, are hydrogen or alkyl of up to 3 carbon atoms, which can be substituted by alkoxy radicals of up to 3 carbon atoms; or
- $R_2$ and $R_3$ can together also represent an acetal or ketal grouping containing 2 to 10 carbon atoms; and
- Z is a valency bond or two digitoxose residues.

We have found that the new 16-O-alkyl derivatives of gitoxigenin-digitoxoside are substantially better resorbed than the unsubstituted gitoxigenin-digitoxoside and gitoxin and that they are more stable in the organism than the therapeutically used glycosides pentaacetylgitoxin and pentaformylgitoxin. Therefore, they are especially good for the oral therapy of cardiac insufficiency.

The new compounds (I) according to the present invention can be prepared, for example, by reacting a compound of the formula

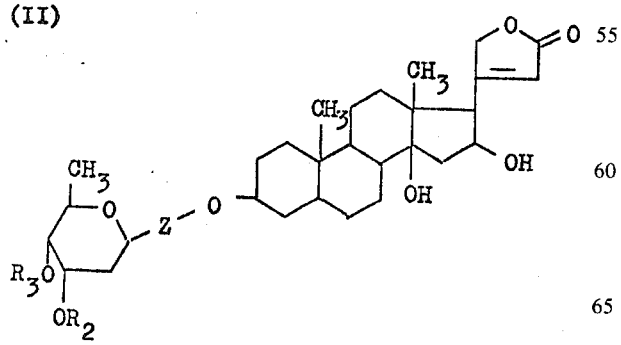

(II)

wherein $R_2$, $R_3$ and Z have the same meanings as above, with an alkylating agent, whereafter, if desired, an acetal or ketal grouping $R_2 + R_3$ is split off.

As the alkylating agent, there can be used, for example an alkyl halide, dialkyl sulfate or diazoalkane. The alkylation is preferably carried out in an inert solvent at a slightly elevated temperature, a conventional catalyst, for example an alcoholate, being added, if desired. If an acetal or ketal grouping $R_2 + R_3$ is to be split off, this is advantageously accomplished by treatment with a dilute organic carboxylic acid.

As examples of the acetal or ketal grouping $R_2 + R_3$, there may be mentioned straight-chained or branched alkylidene radicals, cycloalkylidene radicals and aralkylidene radicals.

Most of the starting materials of formula (II) are known. They can be prepared, for example, in the manner described in German Patent Specification No. 1,568,216.

The following Examples are given for the purpose of illustrating the present invention; the $hR_F$ values given therein were measured on Merck thin layer finished plates "Silicagel F 254;" impregnation: 20% formamide in acetone; eluent: heptanemethyl ethyl ketone (1:1); detection: trichloroacetic acidchloramine reagent, fluorescence upon irradiating with ultraviolet light $\lambda = 366$ nm.

EXAMPLE 1

Preparation of 16-O-Methyl-3',4'-isopropylidene-gitoxigenin-digitoxoside 1 g 3',4'-isopropylidene-gitoxigenin-digitoxoside in 14 ml dimethyl formamide was stirred for 48 hours at 50°C with 2.16 g aluminum isopropylate and 1.87 ml methyl iodide. Subsequently, the reaction solution was poured into a mixture of 67 ml methanol and 110 ml 10% aqueous acetic acid, the whole solution was extracted 6 times with 20 ml amounts of chloroform and the chloroform phase was washed twice with 5% aqueous sodium bicarbonate solution and then dried over anhydrous sodium sulfate. After filtering and evaporating the chloroform extract, the residue obtained was dissolved in carbon tetrachloride/chloroform (10% chloroform) and fractioned on 20 g aluminum oxide (Brockmann). The carbon tetrachloride-chloroform fractions (10% and 20% chloroform) gave, after evaporation and crystallization of the residue from ether/ligroin (1:1), 550 mg. 16-O-methyl-3',4'-isopropylidene-gitoxigenin-digitoxoside; m.p. 196°–197°C; $hR_F$ value 39.

The starting material was advantageously prepared in the following manner:

10 g gitoxigenin-digitoxoside were stirred for 6 hours at ambient temperature in 180 ml acetone-dimethoxypropane (1:1) with 5 g oxalic acid. The reaction solution was then poured into 2.0 liters methanol/water (1:1) and the whole solution extracted 6 times with 1/10th volume amounts of chloroform. The chloroform phase was washed twice with 5% aqueous sodium bicarbonate solution and then dried over anhydrous sodium sulfate. After filtering and evaporating the solvent the residue obtained was taken up in 120 ml chloroform, filtered over 120 g aluminum oxide in order to remove traces of starting material and the aluminum oxide washed with 360 ml chloroform. After evaporation of the chloroform solution, there were obtained 10.2 g chromatographically pure 3',4'-isopropylidene-gitoxigenin-digitoxoside; m.p. 201°–204°C.

EXAMPLE 2

Preparation of
16-O-Ethyl-3',4'-isopropylidene-gitoxigenin-digitoxoside 1 g 3',4'-isopropylidene-gitoxigenin-digitoxoside in 14 ml dimethyl formamide was stirred for 48 hours at 50°C with 2.14 g aluminum isopropylate and 2.3 ml freshly distilled ethyl iodide. After working up the reaction mixture in a manner analogous to that described in Example 1, followed by chromatography on aluminum oxide (Brockmann; carbon tetrachloride/10% and 20% chloroform), there were obtained 580 mg of unchanged starting material and 240 mg amorphous 16-O-ethyl-3',4'-isopropylidene-gitoxigenin-digitoxoside; $[\alpha]_D^{20} = 8.6°$ (c. = 0.5 in methanol); $hR_F$ value 43.

EXAMPLE 3

Preparation of
16-O-Propyl-3',4'-isopropylidene-gitoxigenin-digitoxoside 1 g 3',4'-isopropylidene-gitoxigenin-digitoxoside in 14 ml dimethyl formamide were stirred for 48 hours at 50°C with 2.14 g aluminum isopropylate and 2.76 ml propyl iodide. After working up the reaction mixture in a manner analogous to that described in Example 1, there were obtained 760 mg of unchanged starting material and 160 mg amorphous 16-O-propyl-3',4'-isopropylidene-gitoxigenin-digitoxoside; $[\alpha]_D^{20} = 9.6°$ (c. = 0.3 in methanol); $hR_F$ value 46.

EXAMPLE 4

Preparation of
16-O-Methyl-3',4'-cyclohexylidene-gitoxigenin-digitoxoside 1 g 3',4'-cyclohexylidene-gitoxigenin-digitoxoside (m.p. 197°–198°C) in 14 ml dimethyl formamide was reacted with 1.75 ml methyl iodide in the presence of 2 g aluminum isopropylate and then worked up in a manner analogous to that described in Example 1. After crystallization from aqueous methanol, there were obtained 375 g 16-O-methyl-3',4'-cyclohexylidene-gitoxigenin-digitoxoside; m.p. 181°–189°C; $hR_F$ value 43.

EXAMPLE 5

Preparation of
16-O-Methyl-3',4'-benzylidene-gitoxigenin-digitoxoside 1 g 3',4'-benzylidene-gitoxigenin-digitoxoside (m.p. 174°–183°C) in 14 ml dimethyl formamide was stirred for 48 hours at 50°C with 1.98 g aluminum isopropylate and 1.72 ml methyl iodide. After working up in a manner analogous to that described in Example 1, there were obtained 420 mg 16-O-methyl-3',4'-benzylidene-gitoxigenin-digitoxoside. After crystallization from ether/ligroin, it has a melting point of 184°–188°C; $hR_F$ value 37.

EXAMPLE 6

Preparation of
16-O-Methyl-3',4'-n-propylidene-gitoxigenin-digitoxoside 1 g 3',4'-n-propylidene-gitoxigenin-digitoxoside in 14 ml dimethyl formamide was reacted with 2.15 g aluminum isopropylate and 1.88 ml methyl iodide and worked up in a manner analogous to that described in Example 1. After crystallization from ether/ligroin, there were obtained 106 mg 16-O-methyl-3',4'-n-propylidene-gitoxigenin-digitoxoside; m.p. 130°–136°C; $hR_F$ value 40.

EXAMPLE 7

Preparation of
16-O-Methyl-15',16'-isopropylidene-gitoxin 1 g 15',16'-isopropylidene-gitoxin (m.p. 207°–211°C) in 10 ml dimethyl formamide was stirred for 48 hours at 50°C with 1.46 g aluminum isopropylate and 1.28 ml methyl iodide. After working up the reaction mixture in a manner analogous to that described in Example 1, there were obtained 360 mg 16-O-methyl-15',16'-isopropylidene-gitoxin which, after crystallization from ether/ligroin, melts at 189°–207°C; $hR_F$ value 22.

EXAMPLE 8

Preparation of
16-O-Ethoxymethyl-3',4'-isopropylidene-gitoxigenin-digitoxoside 1 g 3',4'-isopropylidene-gitoxigenin-digitoxoside in 15 ml dimethyl formamide and 15 ml dimethylaniline was warmed for 24 hours at 40°C with 5 g ethyl chloromethyl ether. Subsequently, the reaction solution was diluted with water, extracted with chloroform and the chloroform phase evaporated to dryness. The residue obtained was fractionated on silica gel (benzene/ethyl acetate) to give 390 mg amorphous 16-O-ethoxymethyl-3',4'-isopropylidene-gitoxigenin-digitoxoside; m.p. 83°–85°C; $hR_F$ value 30.

EXAMPLE 9

Preparation of
16,3',4'-Tri-(methoxymethyl)-gitoxigenin-digitoxoside 1 g gitoxigenin-digitoxoside in 15 ml dimethyl formamide and 10 ml dimethylaniline was warmed for 24 hours at 40°C with 2.3 g chlorodimethyl ether and the reaction mixture was subsequently worked up in a manner analogous to that described in Example 8. The crude product obtained was fractionated on 40 g silica gel (benzene/5% ethyl acetate) to give 530 mg amorphous 16,3',4'-tri-(methoxymethyl)-gitoxigenin-digitoxoside; m.p. 59°–63°C; $hR_F$ value 42.

EXAMPLE 10

Preparation of 16-O-Methyl-gitoxigenin-digitoxoside 1 g 16-O-methyl-3',4'-isopropylidene-gitoxigenin-digitoxoside (prepared according to Example 1) in 40 ml 50% aqueous acetic acid was left to stand for 16 hours at ambient temperature. Subsequently, the reaction mixture was poured into 250 ml water and extracted 6 times with 30 ml amounts of chloroform. The chloroform phase was washed twice with 5% aqueous sodium bicarbonate solution and then evaporated to dryness. The crude product obtained was dissolved in 60 ml chloroform/carbon tetrachloride (1:1) and fractionated on silica gel (chloroform/1% and 2% methanol) to give 430 mg 16-O-methyl-gitoxigenin-digitoxoside which, after crystallization from methanol/water, melts at 149°–155°C; $hR_F$ value 4.

EXAMPLE 11

Preparation of 16,3',4'-Trimethyl-gitoxigenin-digitoxoside 1 g gitoxigenin-digitoxoside in 11 ml dimethyl formamide was stirred for 30 minutes at ambient temperature with 1.95 g barium oxide, 1.95 g barium hydroxide oxtahydrate and 4 ml dimethyl sulfate. Subsequently, the reaction mixture was diluted with 100 ml chloroform, filtered with suction, again washed with chloroform and the filtrate was mixed with 6 ml pyridine and then evaporated in a vacuum. The residue obtained was taken up in chloroform, the solution was shaken out with water and, after drying over anhydrous sodium sulfate, was evaporated. The crude product was dissolved in benzene and fractionated in the usual manner on 30 g silica gel (benzene/ethyl acetate) to give 280 mg 16,3',4'-trimethyl-gitoxigenin-digitoxoside which, after crystallization from chloroform/ether, melts at 208°–212°C; $hR_F$ value 32.

EXAMPLE 12

Preparation of 16-O-Methyl-gitoxin 1 g 16-O-methyl-15',16'-isopropylidene-gitoxin in 50 ml 70% acetic acid was left to stand overnight at ambient temperature. The reaction mixture was subsequently poured into 330 ml water and the aqueous phase was extracted 6 times with 30ml amounts of chloroform. The chloroform phase was washed twice with 5% aqueous sodium bicarbonate solution and then evaporated to dryness. The crude product obtained was fractionated on cellulose (n-heptane/methyl ethyl ketone 1:1) to give, after crystallization from acetone/ether, 275 mg 16-O-methylgitoxin; m.p. 216°–218°C; $hR_F$ value 57 (xylene/methyl ethyl ketone 2:3).

As noted above, the instant compounds are useful and efficacious in the oral therapy of cardiac insufficiency. The following experiments were performed to illustrate the activity of compounds representative of the invention in this regard.

The object of the test procedures was to evaluate the resorption properties of the compounds of the invention as compared to known materials (set forth below). The criterion of the effectiveness of the test compounds, when administered enterally, was the determination of that period of time, which, following intraduodenal injection of the compounds to guinea pigs, resulted in ventricular extrasystoles and cardiac arrest.

Test Procedure

Guinea pigs which had been subjected to urethane anesthesia were employed in the tests. A canula was fixedly inserted into the duodenum above the bile-duct juncture. The test glycosides were then intraduodenally injected in the dosages as set forth in the table which follows. In each case, 10ml/kg of an aqueous solution containing 1% methylcellulose and 5% dimethylacetamide was employed as vehicle for the test compounds. The EKG was followed on the oscilloscope and the exact point was determined at which the first ventricular extrasystoles occurred. If, for a period of 4 seconds no EKG pattern could be observed, it was established that cardiac arrest had occurred.

On an average, there were six animals used per substance and dose. The results are set out in the following table:

| Active Compound | Preparative Example No. | Guinea pigs Intra-duodenal mg/kg | Minutes until death |
|---|---|---|---|
| Gitoxigenin-digitoxoside | — | 20 | >120 |
| 16-O-Methyl-3',4'-isopropylidene-gitoxigenin-digitoxoside | 1 | 3 | 25 |
| 16-O-Methyl-3',4'-n-propylidene gitoxigenin-digitoxoside | 6 | 1 | 36 |
| 16,3',4'-Tri-methoxymethyl-gitoxigenin-digitoxoside | 9 | 3 | 120 |
| 16-O-Methyl-gitoxigenin-digitoxoside | 10 | 1 | 36 |
| 16,3',4'-Trimethyl-gitoxigenin-digitoxoside | 11 | 3 | 24 |
| Gitoxin | — | 20 | >120 |
| 16-O-Methyl-15',16'-isopropylidene-gitoxin | 7 | 2 | 50 |
| 16-O-Methyl-gitoxin | 12 | 1 | 45 |

As can be seen from the table, the death of the animals occurs after an appreciably shorter time with the new compounds than with gitoxigenin-digitoxoside and gitoxin, i.e., the inventive compounds are resorbed better and more quickly than the comparison materials.

The new compounds (I) according to the present invention can be administered enterally and parenterally in solid or liquid form. For this purpose, at least one of the new compounds (I) is admixed with a solid or liquid pharmaceutical diluent or carrier. As injection medium, it is preferred to use water which contains the conventional additives for injection solutions, for example, stabilizing agents, solubilizing agents and buffers. Additives of this type include, for example, tartrate and citrate buffers, ethanol, complex-forming agents (such as ethylenediamine-tetraacetic acid and the non-toxic salts thereof) and high molecular weight polymers (such as liquid polyethylene oxide) for viscosity regulation. Solid carrier materials include, for example, starch, lactose, mannitol, methyl cellulose, talc, highly-dispersed silicic acid, high molecular weight fatty acids (such as stearic acid), gelatine, agar-agar, calcium phosphate, magnesium stearate, animal and vegetable fats and solid high molecular weight polymers (such as polyethylene glycols). Compositions suitable for oral administration can, if desired, contain flavoring and/or sweetening agents.

Usually, the compounds of the invention are administered orally, for instance in the form of tablets or pills. The new compounds can also be administered parenterally, for instance, by intravenous injection. For this purpose, they are employed in the form of injectable solutions in water or isotonic salt solutions.

The compounds according to the present invention are preferably not used as such in undiluted form but are diluted with suitable diluting agents as they are conventionally used as pharmaceutical carriers. Such dilution allows better and more economical use to be made thereof.

For making tablets, pills and other solid forms for medication, uniform dispersion of the active compound throughout the carrier is required. Such a fine and uniform dispersion is achieved, for instance, by intimately mixing and milling the inventive compound with a solid pulverulent diluent and, if required, with tableting adjuvants to the desired degree of fineness. One may also impregnate the finely pulverized, solid carrier, while milling, with a solution of the active compound in water or a suitable solvent and removing the solvent during such milling.

As solid pharmaceutical carriers, various inert pulverulent distributing agents, as they are conventionally used in the pharmaceutical industry, may be employed.

Solid diluents which are admixed to the active compounds, especially when preparing tablets, pills and other compressed forms, are the commonly used diluting agents, such as cornstarch, dextrose, lactose, sugar and the like. For making tablets and other compressed medication forms, binders such as pectins, gelatin, gum arabic, methylcellulose, yeast extract, agar, tragacanth, and lubricants such as magnesium stearate, calcium stearate, stearic acid, talc and the like are used.

The amount of inventive compound present in such preparations may, of course, vary. It is necessary that the active ingredient be contained therein in such an amount that a suitable dosage will be ensured. Ordinarily, the preparations should not contain less than about 0.1 mg of the inventive compound. The preferred amount in orally administered preparations such as tablets, pills and the like, is between about 0.2 mg and 1.0 mg per day.

The doses to be administered vary according to the type of action desired, i.e., whether said action is to be digitalization or maintenance. It is, of course, understood that the physician will determine the proper amounts to be given to a patient depending upon the symptoms to be alleviated and the patient's condition and that the doses given above are by no means limiting the inventive compounds to such dosages.

It will be understood that the specification and examples are illustrative but not limitative of the present invention and that other embodiments within the spirit and scope of the invention will suggest themselves to those skilled in the art.

What is claimed is:

1. Gitoxigenin-digitoxoside compound of the formula

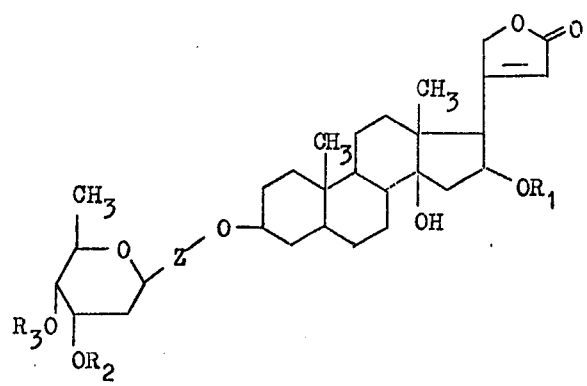

wherein
$R_1$ is alkyl of up to 3 carbon atoms or alkoxyalkyl of up to 3 carbon atoms per alkyl moiety;
$R_2$ and $R_3$ are individually selected from hydrogen, alkyl of up to 3 carbon atoms or alkoxyalkyl of up to 3 carbon atoms per alkyl moiety; or
$R_2$ and $R_3$ together represent an acetal or ketal grouping of from 2 to 10 carbon atoms; and
Z is a valency bond or represents two digitoxose residues.

2. Compound as claimed in claim 1, wherein $R_1$ is alkyl of up to 3 carbon atoms.

3. Compound as claimed in claim 1, wherein $R_1$ is alkoxyalkyl of up to 3 carbon atoms per alkyl moiety.

4. Compound as claimed in claim 1, wherein $R_2$ is hydrogen.

5. Compound as claimed in claim 1, wherein $R_3$ is hydrogen.

6. Compound as claimed in claim 1, wherein $R_2$ is alkyl of up to 3 carbon atoms.

7. Compound as claimed in claim 1, wherein $R_3$ is alkyl of up to 3 carbon atoms.

8. Compound as claimed in claim 1, wherein $R_2$ is alkoxyalkyl.

9. Compound as claimed in claim 1, wherein $R_3$ is alkoxyalkyl.

10. Compound as claimed in claim 1, wherein $R_2$ and $R_3$, taken together, is an acetal grouping of up to 6 carbon atoms.

11. Compound as claimed in claim 1, wherein $R_2$ and $R_3$, taken together, is a ketal grouping of up to 6 carbon atoms.

12. Compound as claimed in claim 1, wherein Z is a valence bond.

13. Compound as claimed in claim 1, wherein Z represents two digitoxose residues.

14. Compound as claimed in claim 1, designated 16-O-methyl-3',4'-isopropylidene-gitoxigenin-digitoxoside.

15. Compound as claimed in claim 1, designated 16-O-methyl-3',4'-n-propylidene-gitoxigenin-digitoxoside.

16. Compound as claimed in claim 1, designated 16-O-methyl-15',16'-isopropylidene-gitoxin.

17. Compound as claimed in claim 1, designated 16-O-methyl-gitoxigenin-digitoxoside.

18. Compound as claimed in claim 1, designated 16,-3',4'-trimethyl-gitoxigenin-digitoxoside.

19. Compound as claimed in claim 1, designated 16-O-methyl-gitoxin.

* * * * *